United States Patent
Chuang et al.

(10) Patent No.: US 10,691,867 B2
(45) Date of Patent: Jun. 23, 2020

(54) IDENTIFYING ROOT CAUSE OF LAYOUT VERSUS SCHEMATIC ERRORS

(71) Applicant: Synopsys, Inc., Mountain View, CA (US)

(72) Inventors: Wei-shun Chuang, Taipei (TW); Chiu-yu Ku, Taipei (TW)

(73) Assignee: Synopsys, Inc., Mountain View, CA (US)

( * ) Notice: Subject to any disclaimer, the term of this patent is extended or adjusted under 35 U.S.C. 154(b) by 30 days.

(21) Appl. No.: 16/103,599

(22) Filed: Aug. 14, 2018

(65) Prior Publication Data
US 2019/0065660 A1    Feb. 28, 2019

Related U.S. Application Data

(60) Provisional application No. 62/549,578, filed on Aug. 24, 2017.

(51) Int. Cl.
*G06F 30/398* (2020.01)
*G06F 16/901* (2019.01)
*G06F 30/327* (2020.01)
*G06F 119/18* (2020.01)

(52) U.S. Cl.
CPC ........ *G06F 30/398* (2020.01); *G06F 16/9024* (2019.01); *G06F 30/327* (2020.01); *G06F 2119/18* (2020.01)

(58) Field of Classification Search
USPC ........................................................ 716/111
See application file for complete search history.

(56) References Cited

U.S. PATENT DOCUMENTS

| | | | | |
|---|---|---|---|---|
| 6,988,253 | B1 * | 1/2006 | Lipton | ................ G06F 17/5072 716/112 |
| 2004/0194040 | A1 | 9/2004 | Joshi et al. | |
| 2008/0301597 | A1 | 12/2008 | Chen et al. | |
| 2009/0064077 | A1 * | 3/2009 | Uppaluri | ............ G06F 17/5022 716/119 |
| 2014/0059511 | A1 | 2/2014 | Benware et al. | |

FOREIGN PATENT DOCUMENTS

CN    101452492 A    6/2009

OTHER PUBLICATIONS

"Applicability of Distance Computation for Graphs to LVS Discrepancy Analysis," Simulation Standard—A Journal for CAD/CAE Engineers, SILVACO International, Sep. 2000, pp. 7-8, vol. 11, No. 9.

* cited by examiner

*Primary Examiner* — Eric D Lee
(74) *Attorney, Agent, or Firm* — Fenwick & West LLP

(57) ABSTRACT

A layout versus schematic (LVS) tool identifies a detected mismatch between a first graph representing a circuit layout and a second graph representing a circuit schematic. The detected mismatch is a device or net represented by a first node in the first graph and a corresponding second node in the second graph. The LVS tool assigns a first value to the first node and to the second node. The LVS tool iterates through nodes in the first graph and nodes in the second graph to assign values based on the first value, according to a graph coloring algorithm, until reaching a third node of the first graph and a corresponding fourth node of the second graph that are assigned different values. The LVS tool generates an output identifying the third node and the fourth node as a root cause of the detected mismatch.

21 Claims, 5 Drawing Sheets

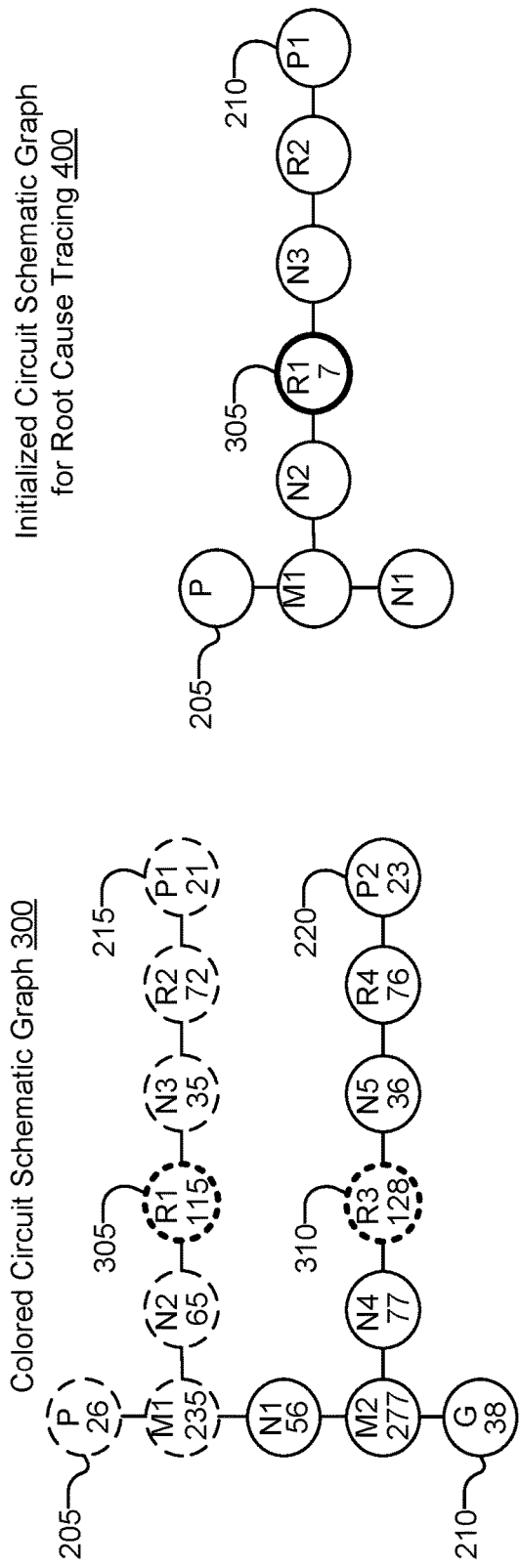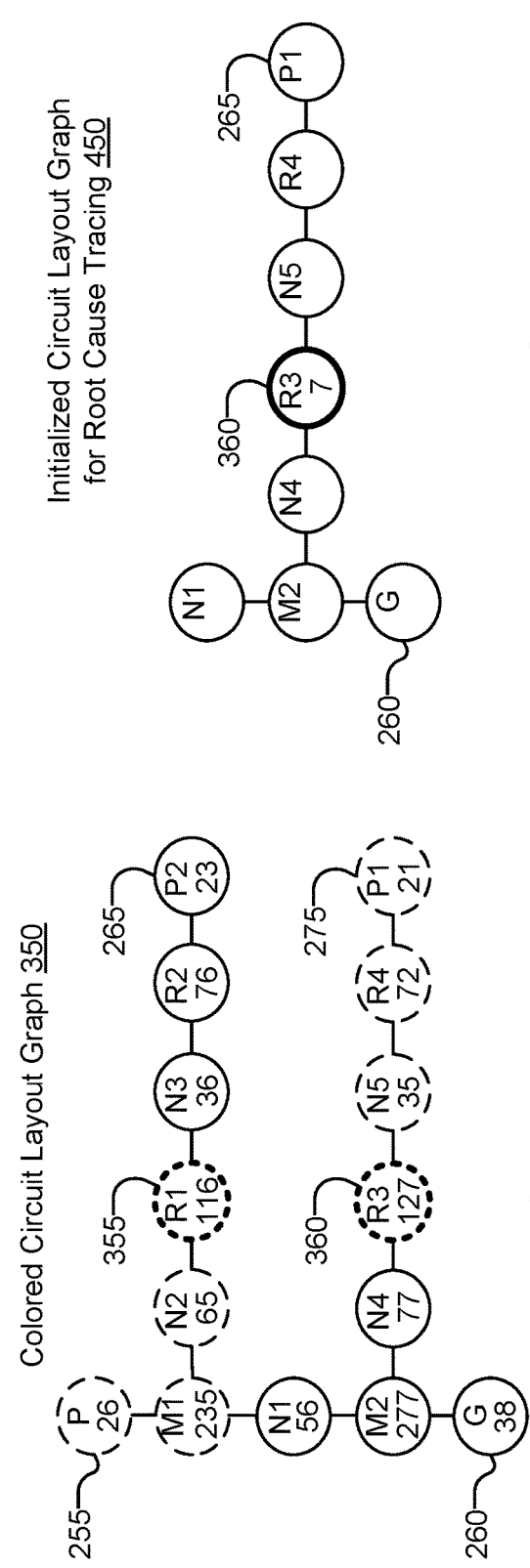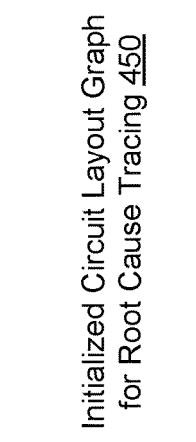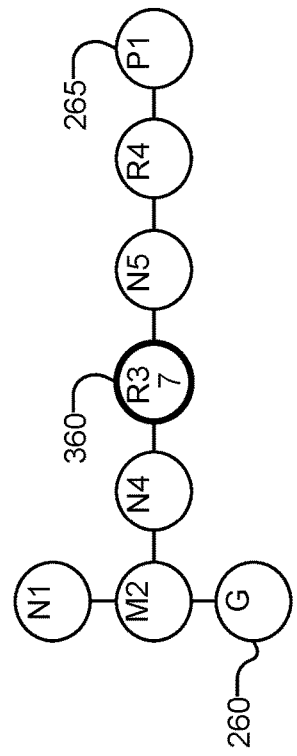
FIG. 3A
FIG. 3B
FIG. 4A
FIG. 4B

IDENTIFYING ROOT CAUSE OF LAYOUT VERSUS SCHEMATIC ERRORS

CROSS REFERENCE TO RELATED APPLICATIONS

This application claims the benefit of priority under 35 U.S.C. § 119(e) to U.S. Provisional Application No. 62/549,578, filed on Aug. 24, 2017, which is incorporated herein by reference in its entirety.

TECHNICAL FIELD

The present disclosure relates generally to detecting root causes of errors in circuit layouts during physical verification of a circuit design.

BACKGROUND

In the process of designing an integrated circuit, a circuit schematic representing the functional design of the circuit is converted to a circuit layout, which represents the physical layout used for manufacture. This conversion often introduces errors into the circuit layout which are corrected by a designer prior to manufacture. These errors are referred to as layout versus schematic (LVS) errors, and can include shorts, opens, incorrect connections between components, and port or net naming errors. While certain types of LVS errors, such as shorts or opens, are trivial to debug, incorrect connection and naming errors can be difficult to debug. LVS analysis tools typically report the locations in the layout and schematic where the LVS tool identified the errors, but these locations may be far away from the root cause of the error. In such situations, a designer has to manually search the layout and the schematic to locate the root cause. In some cases, the designer may be unable to find the root cause.

BRIEF DESCRIPTION OF THE DRAWINGS

To easily identify the discussion of any particular element or act, the most significant digit or digits in a reference number refer to the figure number in which that element is first introduced.

FIG. 3A is the graph representing the circuit schematic of FIG. 1A showing node values after a graph coloring process identifying an LVS mismatch, according to an embodiment.

FIG. 3B is the graph representing the circuit layout of FIG. 1B showing node values after the graph coloring process identifying the LVS mismatch, according to an embodiment.

FIG. 4A is an initialized graph of a portion of the circuit schematic of FIG. 1A for locating the root cause of the LVS mismatch, according to an embodiment.

FIG. 4B is an initialized graph of a portion of the circuit layout of FIG. 1B for locating the root cause of the LVS mismatch, according to an embodiment.

DETAILED DESCRIPTION

Figure 2A:
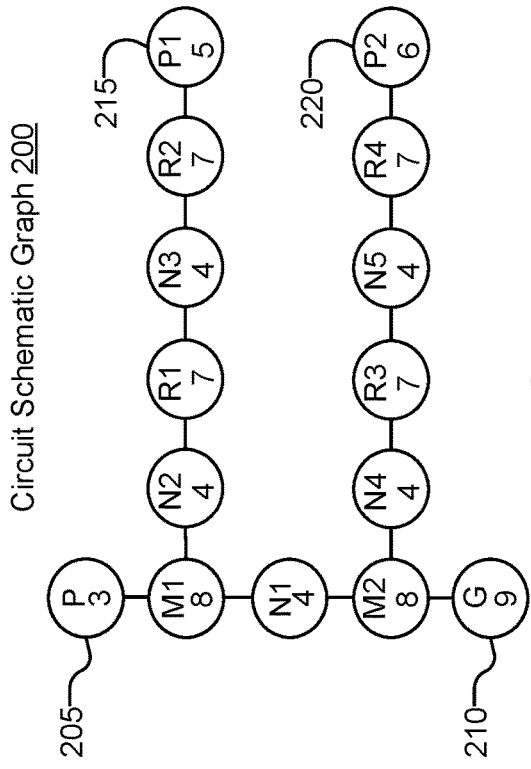
FIG. 2A is a graph representing the circuit schematic of FIG. 1A, according to an embodiment.

Layout versus schematic (LVS) analysis tools (also referred to as "LVS tools") analyze circuit schematics and circuit layouts to detect errors, and report the locations in circuit layouts and related circuit schematics where they have detected LVS errors. For a given pair of a circuit schematic and circuit layout generated based on the schematic, an LVS tool converts both the circuit schematic and the corresponding circuit layout to graphs. The LVS tool compares the two graphs to determine whether the graphs are functionally equivalent, e.g., whether the graphs are isomorphic. If the graphs are functionally equivalent, this indicates that a circuit manufactured based on the circuit layout will behave according to the original circuit design, represented in the circuit schematic.

The LVS tool may represent devices and nets connecting the devices as nodes, and represent the connections between nets and devices as edges. In some embodiments, the LVS tool performs a graph coloring algorithm on the layout graph and the schematic graph to determine functional equivalence. Graph coloring involves assigning information to each node in each graph based on information about each node and each node's neighbors. The assigned information is encoded as values, which are referred to herein as "colors." For example, each value can correspond to a color or other visual characteristic in a visual illustration of the colored graph. However, any algorithm that encodes information about a graph by assigning values to the nodes is referred to herein as a graph coloring algorithm, regardless of whether visual colors or other visual characteristics are assigned or displayed. In an example, the LVS tool performs an iterative process, alternately coloring the device nodes, followed by the net nodes, followed by the device nodes, and so on, until each node is assigned a unique value or "color". The LVS tool then compares the colors of corresponding nodes in the layout graph and the schematic graph to identify mismatch errors in the layout circuit.

A mismatch error occurs when the color of a node in the layout graph corresponding to a particular device or net does not match the color of the node in the schematic graph corresponding to the same device or net. A mismatch error may represent an incorrect connection, e.g., in the circuit schematic, a particular net connects a first device to a second device, while in the circuit layout, that net connects the first device to a third device, which is different from the second device. As another example, a mismatch error may represent an incorrect port name, e.g., the names of two ports in the circuit schematic are swapped in the layout schematic.

The LVS tool identifies the nodes in the layout graph and the schematic graph, or the underlying devices or nets, where the LVS tool detected the mismatch error. However, the graph coloring algorithm often finds the error at a different location from the root cause of the error. In one example, a power and a ground are swapped in a circuit layout. The LVS tool may detect this error at a pair of nodes in the schematic and layout many nodes away from the power and the ground. Using a typical LVS tool, the designer manually traces the schematic and layout from the location of the detected error to try to find the root cause of the error. In a complex circuit, it can take considerable time and effort for the designer to find the root cause. To assist the designer in finding the root cause, a process for automatically identifying the root cause, or a set of potential root causes, is performed.

To identify the root cause of an LVS error, the LVS tool can perform a second coloring algorithm on the layout graph and the schematic graph. This algorithm assumes that the nodes in the layout and schematic graphs at which the error was detected are matched, and then traces back through the graphs to find the location of the root cause. The node in the layout graph and the corresponding node in the schematic graph at which the mismatch was detected (referred to as the "mismatch nodes") are assigned the same initial value, also referred to as a color. The process propagates the color through at least some of the nodes in the layout graph and some of the nodes in the schematic graph, e.g., to assign values to nodes based on the initial value assigned to the mismatch nodes. The values are assigned according to a graph coloring algorithm. For example, in a first iteration, nodes one step away from the mismatch node are each assigned a value based on the initial value of the mismatch nodes. In a second iteration, nodes one step away from the nodes assigned values in the first iteration, and two steps away from the mismatch nodes, are each assigned value based on the values assigned to their neighbor nodes during the prior iteration. This process continues until the LVS tool reaches a pair of corresponding nodes in the schematic and layout graphs that are assigned different values. This pair of nodes, or the underlying devices or nets represented by the corresponding nodes, are returned as the root cause of the mismatch. The circuit layout is corrected at the root cause location to generate a circuit layout for manufacture.

FIGS. 1A through 5B illustrate a simple example of determining that a circuit layout has a mismatch error, and using an example coloring algorithm to trace through circuit and layout graphs to identify the root cause of the error. It should be understood that in other embodiments, alternative graph coloring algorithms may be used.

Figure 1A:
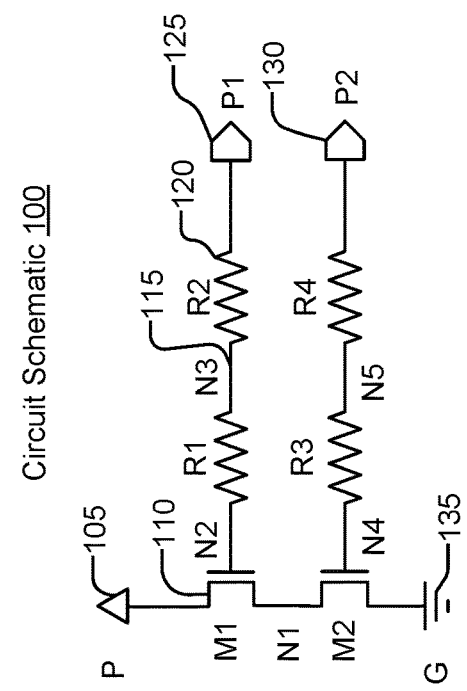
FIG. 1A is a circuit diagram representing a circuit schematic, according to an embodiment.

FIG. 1A is a circuit diagram representing a circuit schematic 100, according to an embodiment. The circuit diagram 100 includes various devices and nets. The circuit diagram 100 has a power P 105; a ground G 135; and two ports, P1 125 and P2 130. The circuit diagram 100 has two transistors, such as transistors M1 110, and four resistors, such as R2 120. The circuit diagram also has nets connecting the devices (i.e., the transistors M1 and M2, and the resistors R1-R4), such as N3 115.

Figure 1B:
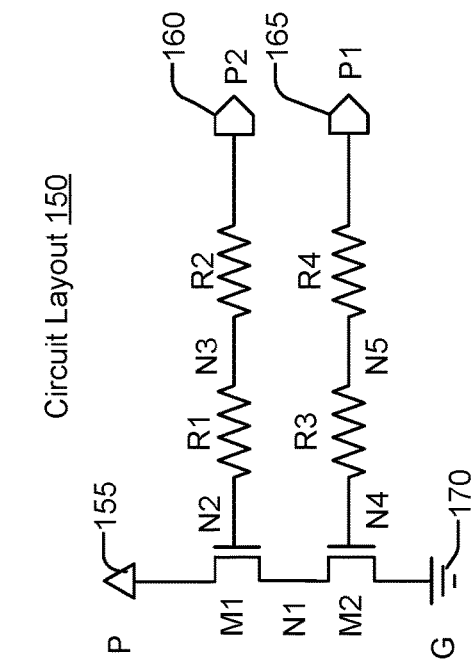
FIG. 1B is a circuit diagram representing a circuit layout, according to an embodiment.

FIG. 1B is a circuit diagram representing a circuit layout 150, according to an embodiment. The circuit layout 150 includes the same elements as the circuit schematic 100, e.g., power 155, a ground 170, and two ports P2 160 and P1 165. In the circuit layout 150, the positions of the two ports P1 165 and P2 160 relative to the power P 155 and ground G 170 are swapped relative to the positions of the two ports P1 125 and P2 130 in the circuit schematic 100. This indicates that in the circuit layout 150, the ports may have been swapped, or the power and the ground may have been swapped.

FIG. 2A is a circuit schematic graph 200 representing the circuit schematic 100 of FIG. 1A, according to an embodiment. Each net and device in the circuit schematic 100 is represented by a node in the circuit schematic graph 200. For example, the power supply P 105 is represented by node 205, labeled "P". Each node has been assigned an initial value, or color, based on the type of net or device the node represents. In this example, the power supply P 205 is assigned the value 3, the ground G 210 is assigned the value 9, each transistor M is assigned a value 8, each resistor R is assigned a value 7, each net N is assigned a value 4, port P1 215 is assigned a value 5, and port P2 220 is assigned a value 6.

Figure 2B:
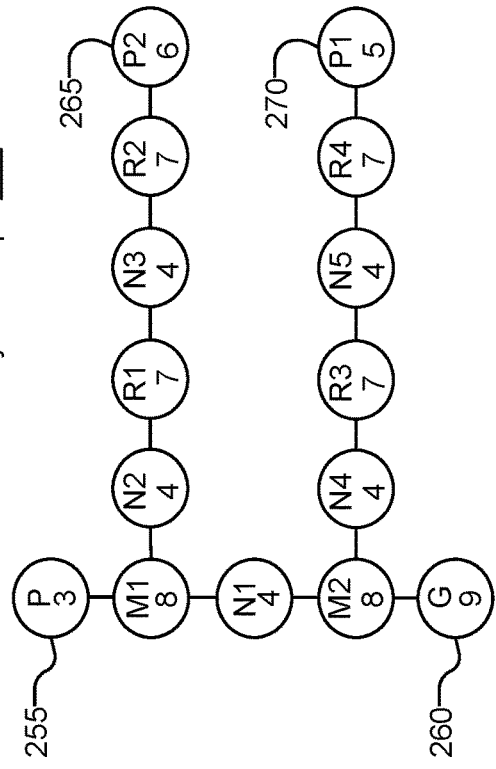
FIG. 2B is a graph representing the circuit layout of FIG. 1B, according to an embodiment.

FIG. 2B is a circuit layout graph 250 representing the circuit layout 150 of FIG. 1B, according to an embodiment. As with the circuit schematic graph 200, each net and device in the circuit layout 150 is represented by a node in the circuit layout graph 250. For example, power supply P 155 is represented by node 255, labeled "P". Each node has been assigned an initial value, or color, based on the type of net or device the node represents. The same numbering schemed used for assigning values to the circuit schematic graph 200 is used for the circuit layout graph 250. As shown in FIG. 2A, the power supply P 255 has a value 3, the ground G 260 has a value 9, port P1 270 has a value 5, and port P2 265 has a value 6.

FIG. 3A is a colored circuit schematic graph 300 representing the circuit schematic 100 of FIG. 1A and showing node values after a graph coloring process that identifies an LVS mismatch, according to an embodiment. The graph coloring process may involve calculating a value for each node based on its neighboring nodes. For example, one graph coloring process involves adding the values of the neighboring net nodes to the value of each device node, followed by adding the values of the neighboring device nodes to the value of each net node, and repeating this process until a stopping condition is reached, e.g., each node has a unique value. In some embodiments, a multiplication factor is used for particular nodes and connections, e.g., gates are multiplied by two.

FIG. 3B is a colored circuit layout graph 350 representing the circuit layout 150 of FIG. 1B and showing node values after the graph coloring process that identifies the LVS mismatch, according to an embodiment. The same graph coloring process used for the colored circuit schematic graph 300 is used to color the circuit layout graph 350.

Each of the colored circuit schematic graph 300 and colored circuit layout graph 350 may be represented using two "colors," represented in the figures using solid and dashed lines around the nodes. The first color, represented by the dashed line, includes the upper nodes in FIG. 3A, e.g., nodes 205 and 215, and the upper-left and lower-right nodes in FIG. 3B, e.g., nodes 255 and 275. The values assigned to corresponding nodes of this color match between the colored circuit schematic graph 300 and colored circuit layout graph 350. For example, node 215, representing P1 in FIG. 3A, has the same value as node 275, representing P1 in FIG. 3B. The second color, represented by the solid line, includes the lower nodes in FIG. 3A, e.g., nodes 210 and 220, and the lower-left and upper-right nodes in FIG. 3B, e.g., nodes 260 and 265. Again, the values assigned to corresponding nodes of this color match between the colored circuit schematic graph 300 and colored circuit layout graph 350.

However, the nodes for R1 and R3, nodes 305 and 310 in FIG. 3A, and nodes 355 and 360 in FIG. 3B, do not match up between the colored circuit schematic graph 300 and colored circuit layout graph 350. For example, node 305 has a value of 115, which does not match either node R1 355 or node R3 in 360 in the colored circuit layout graph 350. This indicates that there is a mismatch between the colored circuit schematic graph 300 and colored circuit layout graph 350. However, these resistors are not the root cause of the detected mismatch.

To find the root cause, the LVS tool performs the second coloring algorithm. The LVS tool selects a pair of mismatched nodes, one in the colored circuit schematic graph 300 and one in the colored circuit layout graph 350, and assumes that these nodes match. For example, the LVS tool may assume that node 305 matches node 355, or that node 305 matches 360. Based on a given assumption, the LVS tool may select a partition of each graphs including the assumed matched node, and colors each partition to trace back to a potential root cause. For example, the LVS tool may partition each graph 300 and 350 into upper and lower portions, e.g., in graph 300, nodes 205 and 215 and the intervening connecting nodes are a partition that includes node 305; in graph 350, nodes 260 and 275 and the intervening connecting nodes are a partition that includes node 360. In other embodiments, the LVS tool colors each graph until one or more root causes are reached, without partitioning the graphs.

FIG. 4A is an initialized graph of a portion 400 of the circuit schematic of FIG. 1A for locating the root cause of the LVS mismatch, according to an embodiment. The graph 400 includes the upper portion of graph 300. In the initialized graph 400, the mismatch node R1 305 is assigned an initial value of 7. This is the same value assigned to resistors, as shown in FIGS. 2A and 2B. In other embodiments, different values are used for the coloring algorithm for root cause tracing. At initialization of the root cause tracing, the other nodes in the graph 400 are not assigned values.

FIG. 4B is an initialized graph of a portion 450 of the circuit layout of FIG. 1B for locating the root cause of the LVS mismatch, according to an embodiment. The graph 450 includes the lower portion of graph 350. In the initialized graph 400, the mismatch node R3 360 is assigned an initial value of 7. This is the same value assigned to node 305 in graph 400, because nodes 360 and 305 are assumed to be matching. At initialization of the root cause tracing, the other nodes in the graph 450 are not assigned values.

Figure 5A:
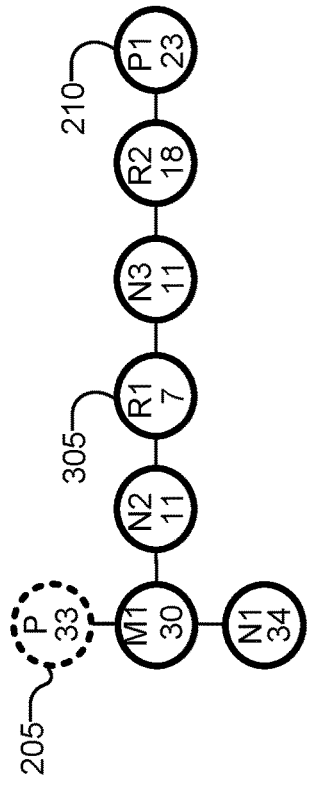
FIG. 5A is the graph representing the circuit schematic portion of FIG. 4A showing node values after a graph coloring process for tracing the root cause of the LVS mismatch, according to an embodiment.
Figure 5B:
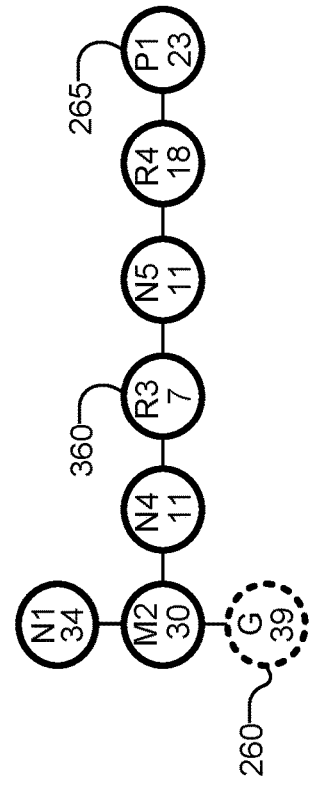
FIG. 5B is the graph representing the circuit layout portion of FIG. 4B showing node values after the graph coloring process for tracing the root cause of the LVS mismatch, according to an embodiment.

FIG. 5A is the graph 500 representing the circuit schematic portion of FIG. 4A showing node values after a graph coloring process for tracing the root cause of the LVS mismatch, according to an embodiment. FIG. 5B is the graph representing the circuit layout portion of FIG. 4B showing node values after the graph coloring process for tracing the root cause of the LVS mismatch, according to an embodiment. The LVS tool iterates through nodes in the graph 400 to assign the values shown in the graph 500, and through nodes in the graph 450 to assign the values shown in the graph 550, according to a graph coloring algorithm. The LVS tool iterates through nodes in both graphs and assign values to nodes based on the initialized value until the LVS tool reaches a pair of nodes in the graphs 500 and 550 that are assigned different values.

The LVS tool propagates values (or "color") outward from the initialized node 305 and the initialized node 360, traversing the graphs 500 and 550 in a breadth-first manner. For example, in graph 500, the LVS tool proceeds in a breadth-first manner from R3 by first assigning values to N2 and N3 (i.e., the nodes one step from R3), followed by M1 and R2 (i.e., the nodes two steps from R3), and so on, continuing to step outward from R3. In graph 550, the LVS tool first assigns values to N4, which correspond to N2 in graph 500, and N5, which corresponds to N3 in graph 500. In this example, to assign each node a value, the LVS tool determines a value of the device or net represented by the node (e.g., based on the values initially assigned to each node in FIGS. 2A and 2B), retrieves a value of any neighboring nodes to which values have already been assigned based on the initialized node, and calculates a sum of the value of the device or net and the values of the neighboring nodes. As an example, to determine the value for the nets N2, N3, N4, and N5, the LVS tool retrieves the value 4 assigned to nets, and adds this value to the value 7 assigned to R1 and R2. In this example, the coloring algorithm multiplies neighbor values that connect through a gate by two. So, the device M1, which connects to N2 by a gate (as shown in FIG. 1A), is assigned 30, which is the sum of the value for a transistor (8) and twice the value of the neighboring node (11).

The values assigned by the LVS tool match between graphs 500 and 550 until the coloring process reaches node 205, which has a value of 33, and node 260, which has a value of 39. This indicates that the elements represented by these nodes—the power supply 105 and the ground 170—may be the root cause of the mismatch. The LVS tool reports these elements to the designer, who can correct the circuit layout 150 prior to manufacture of the circuit.

In some embodiments, the root cause tracing is repeated for different assumptions and portions of the graph to determine a list of possible root causes. For example, the power supply 105 and the ground 170 root cause are a first potential root cause, and the LVS tool may perform a second root cause tracing process (e.g., based on assuming that node 305 representing R1 in graph 300 matches node 355 representing R1 in graph 350) to discover a second potential root cause, such as port P1 125 and port P2 160. The LVS tool may determine, based on the detected mismatch, a set of different assumptions, perform the root cause tracing for each assumption, and generate a list of the potential root causes based on the root cause tracing for each assumption. The LVS tool may report the list of potential root causes to the designer, who can investigate each potential root cause and adjust the circuit layout 150 based on a selected root cause.

The coloring algorithm described above is one way to encode information describing paths from the pair of nodes that are assumed to match. In other embodiments, the matching assumption can be stored in a different way, and the algorithm applied to propagate information from the matching nodes outward can be different. More generally, to determine a root cause of a detected mismatch, the LVS tool assumes the two nodes where the mismatch was detected are matching, and iterates through nodes in the first graph and nodes in the second graph to assign data describing the nodes based on the nodes that are assumed to match. The LVS tool iterates outward from the assumed matching nodes until reaching a node in the first graph and a corresponding node in the second graph for which the data being assigned does not match.

For example, the LVS tool may assume two nodes are matching by storing in memory a pair of identifiers identifying the two nodes that are assumed to match. The LVS tool then iterate outward through nodes in the graph, selecting additional pairs of corresponding nodes between the two graphs. The LVS tool assigns data describing further nodes in each graph based on the graph and the nodes that are assumed to match. For example, the LVS tool may first store the pair [R1, R3] as the pair that are assumed to match, and in a first iteration select and store the pair of nodes to the right of [R1, R3], i.e., [N3, N5], and the pair of nodes to the left of [R1, R3], i.e., [N2, N4]. In the following iteration, the LVS tool selects and stores the pairs [R2, R4] and [M1, M2]. In this case, since each pair includes two of the same type of element (resistors, transistors, or nets), the pairs stored thus far match. In the next iteration, the LVS tool selects the pair [P1, P2]. Since these refer to two different ports, the LVS tool determines that this may be the root cause of the detected mismatch.

In an alternate embodiment, the LVS tool iterates through nodes in each graph, and, for each node, stores the route to the node from the assumed matching node. For example, when iterating through the first graph, the LVS tool stores R1=[R1], N2=[R1, N2], M1=[R1, N2, M1], etc. The LVS tool may store the routes as pairs with corresponding routes in the second graph, or the LVS tool may construct the routes separately for at least some portion of each graph, and compare the stored routes for the two graphs to identify a route cause. The coloring algorithm described above is one way to encode and compress this route data.

Figure 6:
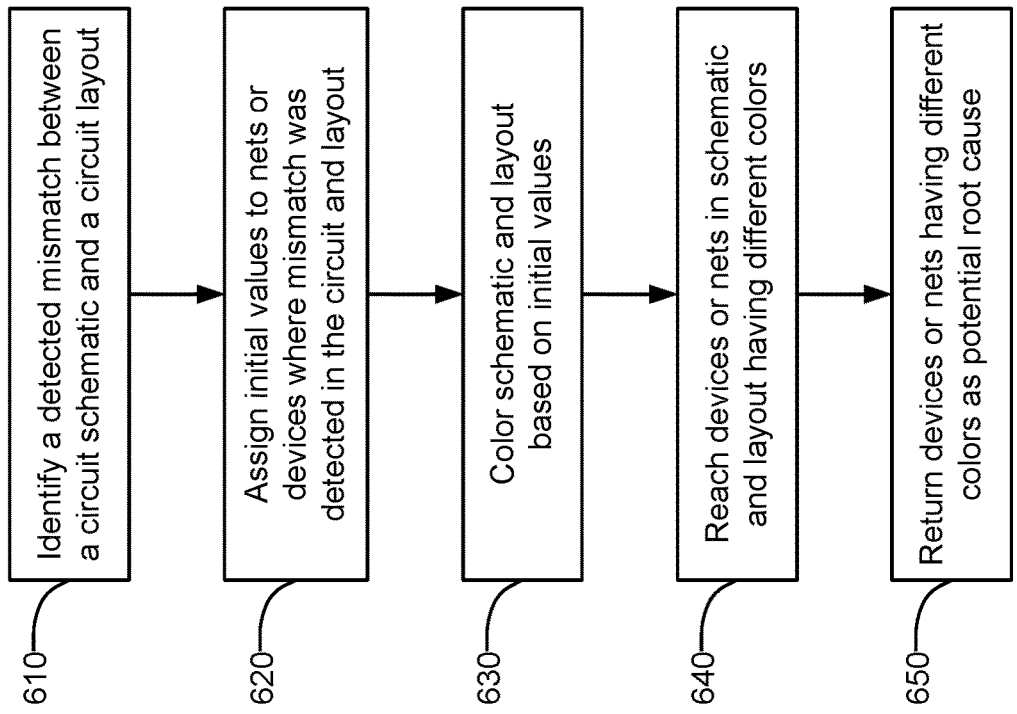
FIG. 6 is a flowchart illustrating a method of identifying a root cause of a LVS error, according to an embodiment.

FIG. 6 is a flowchart 600 illustrating a method of identifying a root cause of a LVS error, according to an embodiment.

The LVS tool identifies 610 a detected mismatch between a circuit schematic and a circuit layout. For example, the LVS tool may identify a detected mismatch between a first graph representing a circuit layout and a second graph representing a circuit schematic. The detected mismatch involves one of a device or a net represented by both a first node in the first graph and a corresponding second node in the second graph.

The LVS tool assigns 620 initial values to nets or devices where the mismatch was detected in the circuit and the layout. For example, the LVS tool assigns the initial value to the first node in the first graph and to the second node in the second graph.

The LVS tool colors 630 the schematic and layout based on the initial values. For example, the LVS tool iterates through nodes in the first graph and nodes in the second graph to assign values to nodes based on the first value of the first node and second node according to a graph coloring algorithm.

The LVS tool reaches 640 a pair of devices or nets in the schematic and layout having different colors. For example, the LVS tool reaches a third node of the first graph and a corresponding fourth node of the second graph that are assigned different values.

The LVS tool returns 650 the devices or nets having different colors as a potential root cause. For example, the LVS tool returns the third node of the first graph and the fourth node of the second graph as a root cause of the detected mismatch. The root cause of the detected mismatch is corrected in the circuit layout prior to manufacture of the circuit.

Overview of Electronic Design Automation Design Flow

Figure 7:
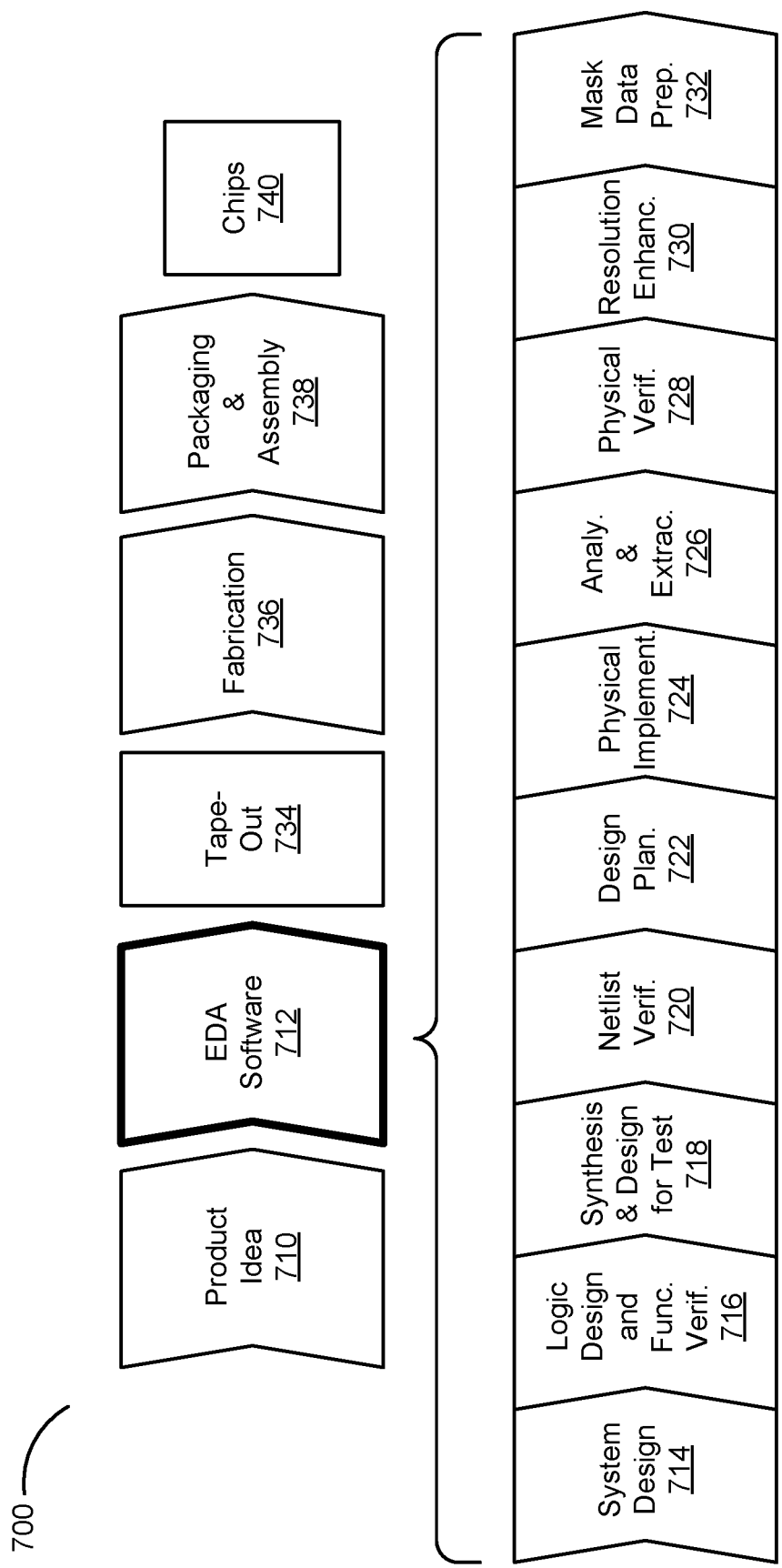
FIG. 7 is a flowchart illustrating the various operations in the design and fabrication of an integrated circuit, according to an embodiment.

FIG. 7 is a flowchart 700 illustrating the various operations in the design and fabrication of an integrated circuit. This process starts with the generation of a product idea 710, which is realized during a design process that uses electronic design automation (EDA) software 712. When the design is finalized, it can be taped-out 734. After tape-out, a semiconductor die is fabricated 736 to form the various objects (e.g., a bitcell including gates, metal layers, vias) in the integrated circuit design. Packaging and assembly processes 738 are performed, which result in finished chips 740.

The EDA software 712 may be implemented in one or more computing devices including a memory. An example of a memory is a non-transitory computer readable storage medium. For example, the EDA software 712 is stored as instructions in the computer-readable storage medium which are executed by a processor for performing operations 714-732 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 714, designers describe the functionality to implement. They can also perform what-if planning to refine the functionality and to check costs. Note that hardware-software architecture partitioning can occur at this stage. During logic design and functional verification 716, VHDL or Verilog code for modules in the circuit is written and the design is checked for functional accuracy. More specifically, the design is checked to ensure that it produces the correct outputs. During synthesis and design for test 718, VHDL/Verilog is translated to a netlist. This netlist can be optimized for the target technology. Additionally, tests can be designed and implemented to check the finished chips. During netlist verification 720, the netlist is checked for compliance with timing constraints and for correspondence with the VHDL/Verilog source code.

During design planning 722, an overall floor plan for the chip is constructed and analyzed for timing and top-level routing. Example EDA software products from Synopsys, Inc. of Mountain View, Calif. that can be used at this stage include: Astro® and IC Compiler® products. During physical implementation 724, the placement (positioning of circuit elements) and routing (connection of the same) occurs. During analysis and extraction 726, the circuit function is verified at a transistor level, which permits refinement. During physical verification 728, the design is checked to ensure correctness for: manufacturing, electrical issues, lithographic issues, and circuitry. During resolution enhancement 730, geometric manipulations of the layout are performed to improve manufacturability of the design. During mask-data preparation 732, the 'tape-out' data for production of masks to produce finished chips is provided.

Embodiments of the present disclosure can be used during one or more of the above-described stages. Specifically, in some embodiments the present disclosure can be used in EDA software 712 that includes operations for physical verification 728.

Figure 8:
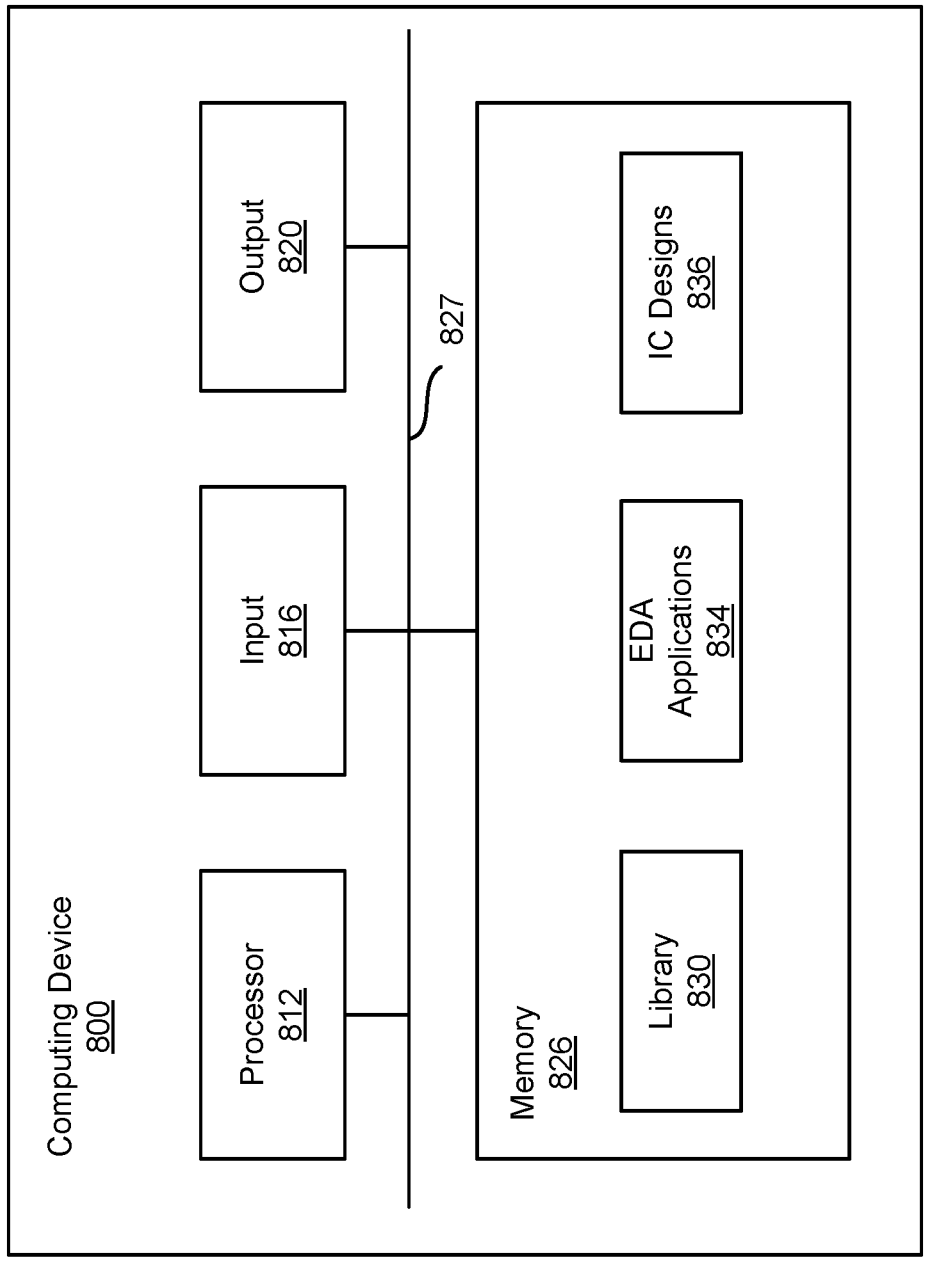
FIG. 8 is a block diagram of a computing device for performing designing operations associated with OTP memory devices, according to an embodiment.

FIG. 8 is a block diagram of a computing device 800 for performing designing operations associated with OTP memory devices. The computer device 800 may include, among other components, a processor 812, an input module 816, an output module 820, a memory 826 and a bus 827 for connecting these components. The processor 812 executes instructions stored in the memory 826. The input module 816 may include various devices for receiving user input, including keyboards and pointing devices (e.g., mouse and touch screen). The output module 820 includes a display device or interface device for communicating with the display device.

The memory 826 is a non-transitory computer readable storage medium storing, among others, library 830, electronic design automation (EDA) applications 834 and integrated circuit (IC) designs 836. The library 830 may include data on various circuit components, including instances of OTP memory device describe herein. The EDA applications 834 may include various software programs for designing ICs, including place and route tools, synthesis tools, and verification tools. The design processed by the EDA applications 834 may be stored in IC designs 836. The IC designs 836 may be an entire operational circuit or a part of a larger IC circuit.

Upon reading this disclosure, a reader will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for identifying a root cause of a layout versus schematic (LVS) error in a layout of a circuit for manufacture, comprising:
    identifying a detected mismatch between a first graph representing a circuit layout and a second graph representing a circuit schematic, the detected mismatch comprising a first node in the first graph and a corresponding second node in the second graph, the mismatch detected based on a calculated value of the first node being different from a calculated value of the second node;
    assigning a first value to the first node in the first graph and to the second node in the second graph;
    iterating through nodes in the first graph and nodes in the second graph to assign values to the nodes based on the first value according to a graph coloring algorithm, until reaching a third node of the first graph and a corresponding fourth node of the second graph, the third node being assigned a second value, and the fourth node being assigned a third value different from the second value, each of the nodes representing one of a device or a net of the respective circuit layout or circuit schematic; and
    generating an output identifying the third node of the first graph and the fourth node of the second graph as a root cause of the detected mismatch, wherein the root cause of the detected mismatch is corrected in the circuit layout prior to manufacture of the circuit.

2. The method of claim 1, wherein iterating through nodes in the first graph and nodes in the second graph until reaching the third node of the first graph and the corresponding fourth node of the second graph comprises:
    breadth-first traversing the first graph from the first node until the third node is reached; and
    breadth-first traversing the second graph from the second node until the fourth node is reached.

3. The method of claim 1, wherein assigning a value to a node based on the first value of the first node and second node comprises:
    determining a value of the device or the net represented by the node;
    retrieving a value of a neighboring node, the value of the neighboring node based on the first value of the first node and the second node;
    calculating a sum of the value of the device or the net represented by the node and the value of the neighboring node; and
    assigning the calculated sum as the value of the node.

4. The method of claim 1, wherein the root cause comprises a first potential root cause, the detected mismatch further comprises a fifth node in the first graph and a corresponding sixth node in the second graph, the method further comprising determining and generating an output identifying a seventh node of the first graph and an eighth node of the second graph as a second potential root cause of the detected mismatch.

5. The method of claim 4, further comprising:
    partitioning the first graph into a first sub-graph comprising the first node and a second sub-graph comprising the fifth node; and
    partitioning the second graph into a third sub-graph comprising the second node and a third sub-graph comprising the sixth node;
    wherein iterating through nodes in the first graph and nodes in the second graph comprises iterating through nodes in the first sub-graph and nodes in the third sub-graph.

6. The method of claim 1, further comprising:
    receiving the circuit layout, the circuit layout comprising a plurality of devices and a first plurality of nets;
    receiving the circuit schematic, the circuit schematic comprising the plurality of devices and a second plurality of nets;
    converting the circuit layout to the first graph, wherein the first graph comprises a first plurality of nodes corresponding to the plurality of devices, a second plurality of nodes corresponding to the first plurality of nets in the circuit layout, and a first plurality of edges, each edge corresponding to a connection between a device and a net in the circuit layout; and
    converting the circuit schematic to the second graph, wherein the second graph comprises a third plurality of nodes corresponding to the plurality of devices, a fourth plurality of nodes corresponding to the second plurality of nets in the circuit schematic, and a second plurality of edges, each edge corresponding to a connection between a device and a net in the circuit schematic.

7. The method of claim 1, wherein identifying the detected mismatch between the first graph representing the circuit layout and the second graph representing the circuit schematic comprises:
    assigning an initial node value to each node in the each of the first graph and the second graph;
    calculating unique values for each node in the first graph and each node in the second graph, according to a second graph coloring algorithm, based on the initial node values and connections between the nodes; and
    identifying, as the detected mismatch, a node in the first graph and a corresponding node in the second graph having different unique values.

8. The method of claim 1, wherein at least one of:
    the third node of the first graph is different from the first node of the first graph, and
    the fourth node of the second graph is different from the second node of the second graph.

9. A non-transitory computer readable medium comprising stored instructions for performing operations to identify a root cause of a layout versus schematic (LVS) error in a layout of a circuit for manufacture, the instructions when executed by at least one processor cause the processor to:
    identify a detected mismatch between a first graph representing a circuit layout and a second graph representing a circuit schematic, the detected mismatch comprising a first node in the first graph and a corresponding second node in the second graph, the mismatch detected based on a calculated value of the first node being different from a calculated value of the second node;

assign a first value to the first node in the first graph and to the second node in the second graph;

iterate through nodes in the first graph and nodes in the second graph to assign values to the nodes based on the first value according to a graph coloring algorithm, until reaching a third node of the first graph and a corresponding fourth node of the second graph, the third node being assigned a second value and the fourth node being assigned a third value different from the second value, each of the nodes representing one of a device or a net of the respective circuit layout or circuit schematic; and generate an output identifying the third node of the first graph and the fourth node of the second graph as a root cause of the detected mismatch, wherein the root cause of the detected mismatch is corrected in the circuit layout prior to manufacture of the circuit.

10. The non-transitory computer readable medium of claim 9, wherein the instruction to iterate through nodes in the first graph and nodes in the second graph until reaching the third node of the first graph and the corresponding fourth node of the second graph comprise stored instructions that when executed cause the processor to:

breadth-first traverse the first graph from the first node until the third node is reached; and breadth-first traverse the second graph from the second node until the fourth node is reached.

11. The non-transitory computer readable medium of claim 9, wherein the instructions to assign a value to a node based on the first value of the first node and second node comprise stored instructions that when executed cause the processor to:

determine a value of the device or the net represented by the node;

retrieve a value of a neighboring node, the value of the neighboring node based on the first value of the first node and the second node;

calculate a sum of the value of the device or the net represented by the node and the value of the neighboring node; and assign the calculated sum as the value of the node.

12. The non-transitory computer readable medium of claim 9, wherein the root cause is a first potential root cause, the detected mismatch further comprises a fifth node in the first graph and a corresponding sixth node in the second graph, the non-transitory computer readable medium further comprising stored instructions that when executed cause the processor to determine and generate an output identifying a seventh node of the first graph and an eighth node of the second graph as a second potential root cause of the detected mismatch.

13. The non-transitory computer readable medium of claim 12, further comprising stored instructions that when executed cause the processor to:

partition the first graph into a first sub-graph comprising the first node and a second sub-graph comprising the fifth node; and partition the second graph into a third sub-graph comprising the second node and a third sub-graph comprising the sixth node;

wherein the stored instructions to iterate through nodes in the first graph and nodes in the second graph comprise stored instructions that when executed cause the processor to iterate through nodes in the first sub-graph and nodes in the third sub-graph.

14. The non-transitory computer readable medium of claim 9, further comprising stored instructions that when executed cause the processor to:

receive the circuit layout, the circuit layout comprising a plurality of devices and a first plurality of nets;

receive the circuit schematic, the circuit schematic comprising the plurality of devices and a second plurality of nets;

convert the circuit layout to the first graph, wherein the first graph comprises a first plurality of nodes corresponding to the plurality of devices, a second plurality of nodes corresponding to the first plurality of nets in the circuit layout, and a first plurality of edges, each edge corresponding to a connection between a device and a net in the circuit layout; and convert the circuit schematic to the second graph, wherein the second graph comprises a third plurality of nodes corresponding to the plurality of devices, a fourth plurality of nodes corresponding to the second plurality of nets in the circuit schematic, and a second plurality of edges, each edge corresponding to a connection between a device and a net in the circuit schematic.

15. The non-transitory computer readable medium of claim 9, wherein the instructions to identify the detected mismatch between the first graph representing the circuit layout and the second graph representing the circuit schematic comprise stored instructions that when executed cause the processor to:

assign an initial node value to each node in the each of the first graph and the second graph;

calculate unique values for each node in the first graph and each node in the second graph, according to a second graph coloring algorithm, based on the initial node values and connections between the nodes; and identify, as the detected mismatch, a node in the first graph and a corresponding node in the second graph having different unique values.

16. A system for identifying a root cause of a layout versus schematic (LVS) error in a layout of a circuit for manufacture, comprising:

a processor; and a memory, the memory comprising stored instructions, the instructions for having the processor perform operations of:

identifying a detected mismatch between a first graph representing a circuit layout and a second graph representing a circuit schematic, the detected mismatch comprising a first node in the first graph and a corresponding second node in the second graph, the mismatch detected based on a calculated value of the first node being different from a calculated value of the second node;

assuming the first node in the first graph matches the second node in the second graph;

iterating through at least a portion of nodes in the first graph and a portion of nodes in the second graph to assign data describing the portions of nodes based on the matching first node and second node until reaching a third node of the first graph and a corresponding fourth node of the second graph for which the assigned data does not match, each of the nodes representing one of a device or a net of the respective circuit layout or schematic; and generating an output identifying the third node of the first graph and the fourth node of the second graph as a root cause of the detected mismatch, wherein the root cause of the detected mismatch is corrected in the circuit layout prior to manufacture of the circuit.

17. The system of claim 16, wherein the operation of iterating through the portion of nodes in the first graph and the portion of nodes in the second graph until reaching the third node of the first graph and the corresponding fourth node of the second graph comprises the operations of:
breadth-first traversing the first graph from the first node until the third node is reached; and
breadth-first traversing the second graph from the second node until the fourth node is reached.

18. The system of claim 16, wherein the root cause is a first potential root cause, the detected mismatch further comprises a fifth node in the first graph and a corresponding sixth node in the second graph, the operations further comprising determining and generating an output identifying a seventh node of the first graph and an eighth node of the second graph as a second potential root cause of the detected mismatch.

19. The system of claim 16, further comprising instructions for having the processor perform operations of:
receiving the circuit layout, the circuit layout comprising a plurality of devices and a first plurality of nets;
receiving the circuit schematic, the circuit schematic comprising the plurality of devices and a second plurality of nets;
converting the circuit layout to the first graph, wherein the first graph comprises a first plurality of nodes corresponding to the plurality of devices, a second plurality of nodes corresponding to the first plurality of nets in the circuit layout, and a first plurality of edges, each edge corresponding to a connection between a device and a net in the circuit layout; and
converting the circuit schematic to the second graph, wherein the second graph comprises a third plurality of nodes corresponding to the plurality of devices, a fourth plurality of nodes corresponding to the second plurality of nets in the circuit schematic, and a second plurality of edges, each edge corresponding to a connection between a device and a net in the circuit schematic.

20. The system of claim 16, wherein the operation of assuming the first node in the first graph matches the second node in the second graph comprises storing in a memory an identifier of the first node and an identifier of the second node as a matching pair, and assigning data describing the portions of nodes based on the matching first node and second node comprises the operation of, for each iteration:
selecting at least one pair of nodes comprising a first paired node in the first graph and a second paired node in the second graph, the at least one pair of nodes selected based on the matching first node and second node, and
storing, in the memory, paired identifiers of the first paired node and second paired node.

21. The system of claim 16, wherein assigning data describing the portions of nodes based on the matching first node and second node comprises operations of:
for each node of the portion of nodes in the first graph, storing a set of identifiers describing a route in the first graph to the node from the first node in the first graph; and
for each node of the portion of nodes in the second graph, storing a set of identifiers describing a route in the second graph to the node from the second node in the second graph.

* * * * *